(12) United States Patent
Li et al.

(10) Patent No.: US 10,210,207 B2
(45) Date of Patent: Feb. 19, 2019

(54) PARALLEL EXECUTION OF MERGE OPERATIONS

(71) Applicant: International Business Machines Corporation, Armonk, NY (US)

(72) Inventors: Shuo Li, Beijing (CN); Ping Liang, Beijing (CN); Bing Qing Sun, Beijing (CN); Xiaobo Wang, Beijing (CN); Xin Ying Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 497 days.

(21) Appl. No.: 14/985,791

(22) Filed: Dec. 31, 2015

(65) Prior Publication Data
US 2017/0193043 A1    Jul. 6, 2017

(51) Int. Cl.
*G06F 17/30* (2006.01)

(52) U.S. Cl.
CPC .. *G06F 17/30445* (2013.01); *G06F 17/30339* (2013.01); *G06F 17/30451* (2013.01); *G06F 17/30466* (2013.01)

(58) Field of Classification Search
None
See application file for complete search history.

(56) References Cited

U.S. PATENT DOCUMENTS

| 7,536,432 | B2 | 5/2009 | Yamamoto |
| 2009/0171999 | A1* | 7/2009 | McColl ............. G06F 17/30539 |
| 2010/0088352 | A1* | 4/2010 | Hendrickson ........... H03M 7/04 707/808 |
| 2015/0026122 | A1 | 1/2015 | Mueller |

* cited by examiner

*Primary Examiner* — Tuankhanh D Phan
(74) *Attorney, Agent, or Firm* — Cantor Colburn LLP

(57) ABSTRACT

Aspects include a method that includes receiving a structured query language (SQL) database command at a processing device configured to manage a table space of a relational database, the database command including a merge statement. The method also includes identifying a group of target records from the database command, and associating each target record with one of a plurality of portions of the table space, and in response to determining that the group of target records is associated with more than one portion of the table space, sorting the target records into a plurality of sub-groups, each sub-group associated with a different portion of the table space. The method further includes generating a sub-task associated with each sub-group, the sub-task prescribing aspects of performing the merge operation using an associated sub-group respective sub-group, and performing all of the sub-tasks on the memory space in parallel.

15 Claims, 11 Drawing Sheets

TARGET

| C1 | C2 | C3 | C4 |
|----|----|----|----|
| 1  | 8  | a  | 0  |
| 2  | 9  | b  | 0  |
| 3  | 18 | c  | 0  |
| 4  | 10 | d  | 0  |

Merge

SOURCE

| C1 | C2 | C3  | C4 |
|----|----|-----|----|
| 1  | 0  | xxx | 55 |
| 2  | -2 | yyy | 66 |
| 3  | 2  | hhh | 33 |
| 5  | 7  | zzz | 77 |

| C1 | C2 | C3   | C4 |         |
|----|----|------|----|---------|
| 1  | 8  | xxxa | 60 | UPDATE  |
| 2  | 9  | yyyb | 71 | UPDATE  |
| 3  | 18 | c    | 0  | DELETE  |
| 4  | 10 | d    | 0  |         |
| 5  | 7  | zzz  | 77 | INSERT  |

FIG. 4

PARALLEL EXECUTION OF MERGE OPERATIONS

BACKGROUND

The present invention relates generally to managing memory by a computer processor, and more specifically, to performing merge operations to a database.

Databases are commonly used in computer systems for storing data and accessing data by remote users. Many database management systems manage relational database via structured query language (SQL) protocols. Requests for storing data in a SQL database typically use SQL statements for accomplishing tasks such as merging data from a source location to target locations in the database. Operations performed as part of a merge include insert, delete and update operations.

SUMMARY

An embodiment of a computer-implemented method includes receiving a structured query language (SQL) database command at a processing device, the processing device configured to manage a table space of a relational database, the database command including a merge statement configured to instruct the processing device to perform a merge operation. The method also includes identifying a group of target records from the database command, associating each target record with one of a plurality of portions of the table space, and in response to determining that the group of target records is associated with more than one portion of the table space, sorting the target records into a plurality of sub-groups, each sub-group associated with a different portion of the table space. The method further includes generating a sub-task associated with each sub-group, the sub-task prescribing aspects of performing the merge operation on an associated portion of the table space using an associated sub-group respective sub-group, and performing all of the sub-tasks on the memory space in parallel.

An embodiment of a system includes a memory having computer readable instructions, and one or more processing devices for executing the computer readable instructions. The computer readable instructions include receiving a structured query language (SQL) database command at a processing device, the processing device configured to manage a table space of a relational database, the database command including a merge statement configured to instruct the processing device to perform a merge operation. The instructions also include identifying a group of target records from the database command, associating each target record with one of a plurality of portions of the table space, and in response to determining that the group of target records is associated with more than one portion of the table space, sorting the target records into a plurality of sub-groups, each sub-group associated with a different portion of the table space. The instructions further include generating a sub-task associated with each sub-group, the sub-task prescribing aspects of performing the merge operation on an associated portion of the table space using an associated sub-group respective sub-group, and performing all of the sub-tasks on the memory space in parallel.

An embodiment of a computer program product includes a computer readable storage medium having program instructions embodied therewith, the program instructions executable by a processing device to cause the processing device to perform a method. The method includes receiving a structured query language (SQL) database command at a processing device, the processing device configured to manage a table space of a relational database, the database command including a merge statement configured to instruct the processing device to perform a merge operation. The method also includes identifying a group of target records from the database command, and associating each target record with one of a plurality of portions of the table space, and in response to determining that the group of target records is associated with more than one portion of the table space, sorting the target records into a plurality of sub-groups, each sub-group associated with a different portion of the table space. The method further includes generating a sub-task associated with each sub-group, the sub-task prescribing aspects of performing the merge operation on an associated portion of the table space using an associated sub-group respective sub-group, and performing all of the sub-tasks on the memory space in parallel.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 4 depicts an example of a database merge operation;

DETAILED DESCRIPTION

Various embodiments of methods, systems and computer program products are provided for accessing and managing memory located in or accessible by a processor and/or computer system. An embodiment of a method includes receiving a database command at a processing device (e.g., as a computer or a database manager), the database command including a structured query language (SQL) merge statement. The method includes inspecting target records specified by the database command, and sorting the target records into sub-groups based on each target record's location in a table space. Each sub-group is incorporated into a sub-input, resulting in a plurality of sub-inputs that can be used to perform aspects of a merge operation on multiple table spaces or portions of a table space in parallel.

In one embodiment, the processing device sorts the target records based on a table space map representing the table space, which includes space map pages corresponding to different portions of the table space. For example, a record identifier (RID) associated with each target record is used to determine which space map page specifies the location of the target record, and the target record is sorted into a sub-group associated with the space map page.

Embodiments described herein present numerous advantages, including increased efficiency of merge operation performance. For example, target data may be divided according to the scope of space map pages to generate sub-groups dynamically, which allows for a merge operation to be performed on multiple memory spaces (e.g., table spaces within a database partition) in parallel, which results in high efficiency and reductions in contentions on locks and reductions in latch contentions.

Figure 1:
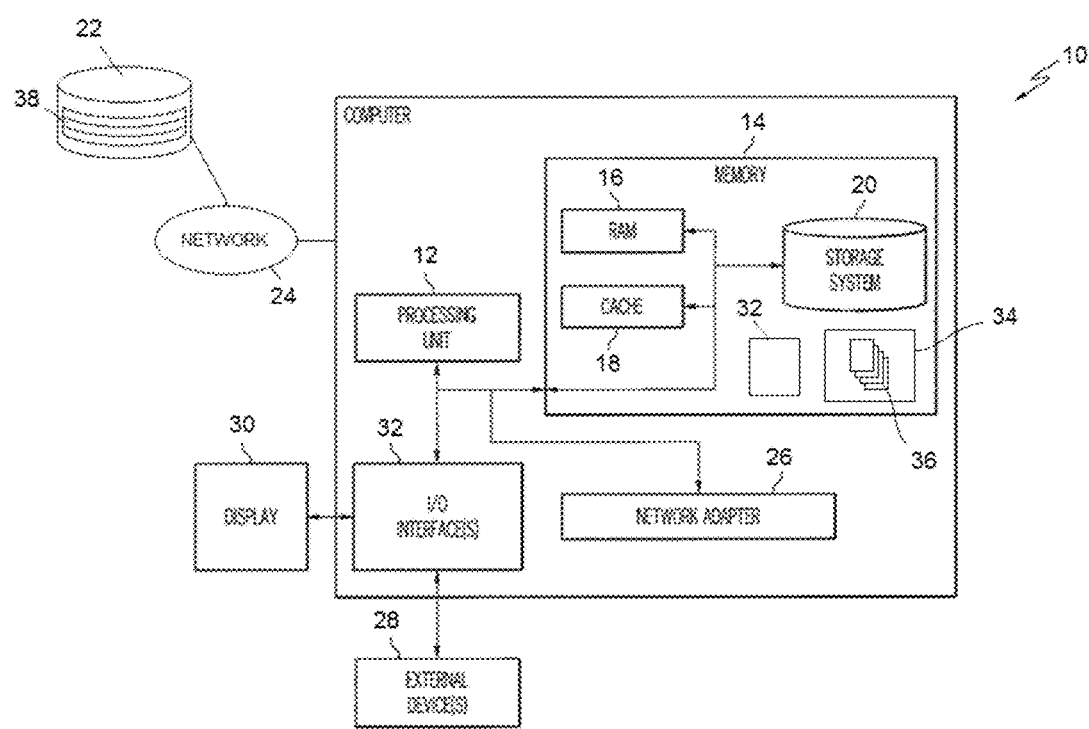
FIG. 1 depicts an embodiment of a computer system for processing and memory management.

FIG. 1 illustrates an embodiment of a computer system 10, which may be used to implement methods and processes described herein, such as a personal computer, workstation, minicomputer, mainframe computer, server and/or network. The system 10 includes a processor 12 (e.g., a microprocessor and/or multi-core processor) and a main memory 14. The processor 12 is a hardware device for executing hardware instructions or software, including those stored in main memory 14, and may be a custom made or commercially available processor, a central processing unit (CPU), an auxiliary processor among several processors associated with the computer system 10, a semiconductor based microprocessor (in the form of a microchip or chip set), a macroprocessor, or other device for executing instructions. Although the processor 12 is shown as a single processor 12, as described herein a processor may refer to multiple processors (e.g., a central processor complex (CPC)). Furthermore, the processor 12, the memory 14 and other components may be real or virtual, e.g., represented logically via a virtual machine.

Main memory 14 stores data and programs that are executed by the processor 12. As described herein, "memory" may refer to the main memory, any internal or external secondary and/or any other physical or virtual device or component that can store data and/or instructions. The memory may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory may incorporate electronic, magnetic, optical, or other types of storage media. For example, as shown in FIG. 1, main memory 14 includes computer system readable media in the form of volatile memory, such as a random access memory (RAM) 16 and/or cache memory 18. The main memory also includes nonvolatile memory in the form of an internal storage system 20. Note that the memory may have a distributed architecture, where various components are situated remote from one another but may be accessed by the processor 12.

In one embodiment, the processor 12 and/or main memory 14 is connected to an external storage device such as an external hard disk or a database 22. This connection may be accomplished via any suitable means, such as a wired connection or a wireless connection. For example, the processing device 12 can communicate with the database 22 via a network 24, such as a local area network (LAN), a general wide area network (WAN), and/or a public network (e.g., the Internet) via a network adapter 26.

The processing device 12 may also communicate with one or more external devices 28 such as a keyboard, a pointing device, a display 30, etc.; one or more devices that enable a user to interact with the processing device 12; and/or any devices (e.g., network card, modem, etc.) that enable the processing device 12 to communicate with one or more other computing devices. Such communication can occur via Input/Output (I/O) interfaces 32. It should be understood that although not shown, other hardware and/or software components could be used in conjunction with the processing device 12. Examples, include, but are not limited to: microcode, device drivers, redundant processing units, external disk drive arrays, RAID systems, tape drives, and data archival storage systems, etc.

Various instructions and/or programs can be stored in the main memory 14 for carrying out various processing functions. For example, instructions in memory include one or more operating systems 32 and programs 34. In one embodiment, the programs 34 are incorporated in a program/utility suite, having a set (at least one) of program or processing modules 36. Each of the operating system, one or more application programs, other program modules, and program data or some combination thereof, may include an implementation of a networking environment. Program modules 36 generally carry out the functions and/or methodologies of embodiments of the invention as described herein.

Databases and other modern storage systems and computers typically manage memory as blocks or sections and utilize various schemes and techniques to manage access to various blocks and keep track of whether memory has been altered. For example, data may be stored in the storage system 20 and/or the database 22 in fixed or variable size sections or partitions 38, which may take many forms. For example, memory may be divided into partitions (physical or logical), segments, pages and/or cache lines. Examples of database memory sections or blocks are described further below in conjunction with various embodiments and examples, but are not limited thereto. Memory partitions as described herein may be any type of memory partition or section used to divide a memory space, such as main memory, a cache, virtual memory and others, and is not limited to the specific embodiments described herein.

In one embodiment, a database may include multiple partitions, each of which may be set up by a processor as a separate memory space. Each memory space may be segmented into one or more data tables that store data pages or other types of memory blocks.

Figure 2:
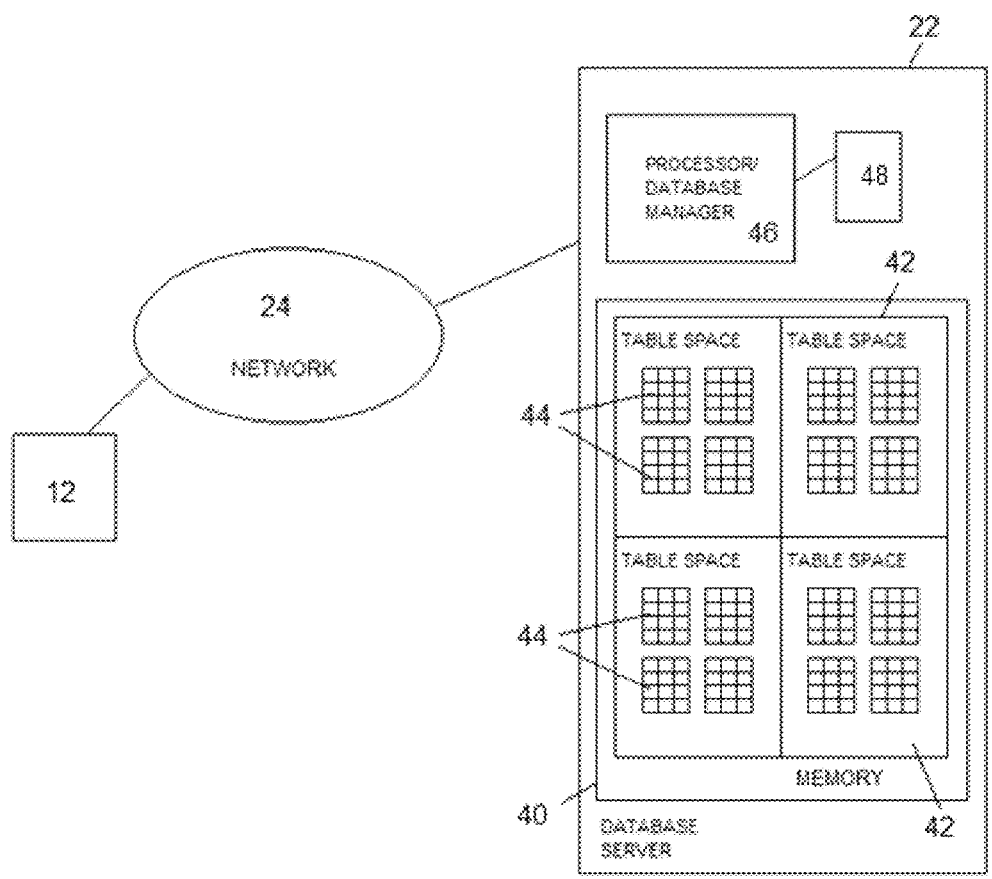
FIG. 2 depicts an embodiment of a database and a database manager for performing database management functions.

FIG. 2 illustrates an example of a memory space located in the database 22. A processing system or device, such as the processing unit 12, is configured to perform and/or facilitate accessing and modifying data stored in the database. The database 22 in this example includes one or more partitions or partition groups 40, each of which is divided into multiple table spaces 42. Within each table space 42, there may be one or more individual tables 44. Operations on data stored in the database may be performed by the processing unit, or performed by another processing device such as a database manager 46. For example, the processing unit 12 is configured as a client computer that submits requests and data to the database manager 46. Although the database manager 4 is shown as part of the database, it may be incorporated in the computing system 10.

Data from a client or other source that is to be stored in the database 22 is stored in one or more of the data tables 44. The data may be stored in a single table, or distributed among multiple tables, table spaces and/or partitions. Furthermore, each table 44 may be logically divided into pages, which are typically numbered contiguously from 0 to n.

The processing unit 12 and/or the database manager 46 utilizes a table space map 48, which is a representation of a table space that describes the logical to physical conversion of page locations in a table space. In a partitioned database, pages in the table space may be logically numbered from 0 to (N−1), where N is the number of usable pages in the table space. The table space map 48 is used by the database manager to locate pages and determine available space within pages and tables 44.

Figure 3:
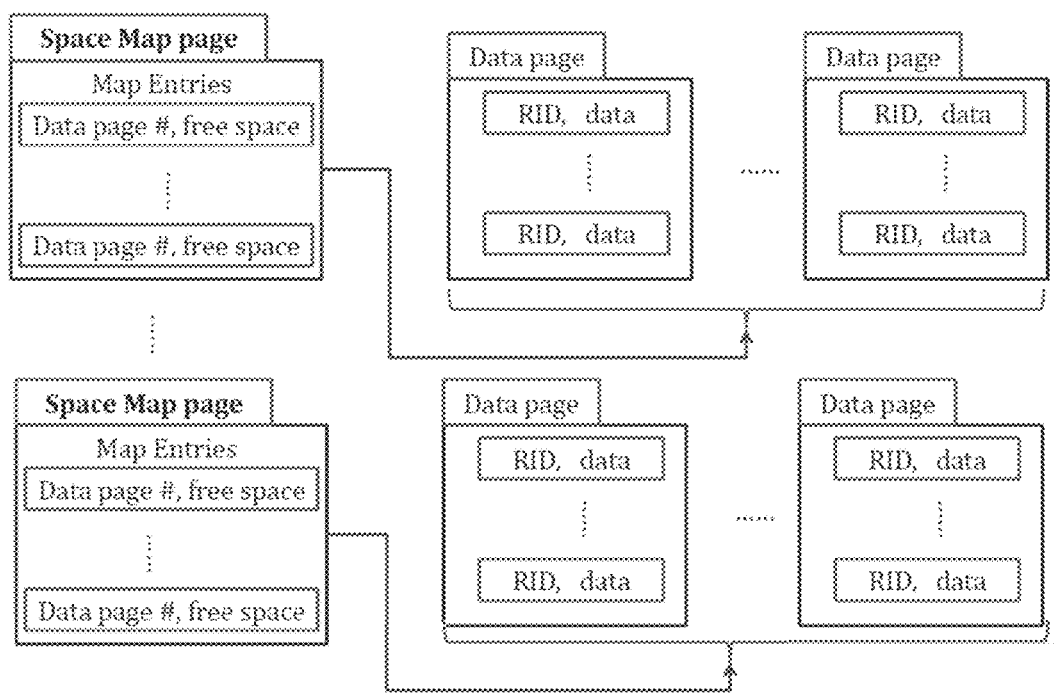
FIG. 3 depicts aspects of a table space map used by a database manager and/or other processor to access and modify storage locations and records in a database.

FIG. 3 shows an example of aspects of a space map and its relation to data stored in the table spaces. The space map includes a number of pages, referred to as "space map pages", each of which represents a table space. Each space map page includes map entries that specify a corresponding data page in a table space, and may also indicate an amount of free space within the corresponding data page.

As shown in FIG. 3, each record in a data page is identified by a record identification or row identification, referred to herein as a "row ID", "record ID" or "RID". The RID uniquely identifies each row so that the row can be readily located by the database manager. In one embodiment, the RID includes a data page number and a row number.

As known in the art, a database is an organized collection of data. It is to be noted that, although a database may be implemented in a file system, a database is different than a file in a file system. For example, a database is accessed by using a set of commands that are specific to databases (e.g., Structured Query Language (SQL) statements such as INSERT, DELETE, UPDATE, MERGE, etc.) while a file is accessed by using a set of commands specific to a file system (e.g., UNIX commands such as ls, my, cp, etc.). Persons of the ordinary skill in the art will recognize other differences between databases and files in a file system.

The processing unit 12 and/or other devices may be configured as clients that can access the database 22 to read, write, insert, delete, or otherwise modify data in the database 22. In some embodiments, database clients may be software components, scripts, or user interfaces that access the database 22 by sending one or more database commands or queries to the database manager 46. The database clients may operate in devices that are remote to the database 22 and/or may operate within the database 22.

The database manager 46 is configured to process database commands that originate from database clients. Specifically, in some embodiments, the database manager 46 performs a set of operations on the database 22 according to a database command. For instance, when the database command includes a SQL MERGE statement, the database manager performs a set of operations to join and/or merge data from a source location (source data). The set of operations may include update, delete and/or insert operations specified by the database command via SQL UPDATE, DELETE and/or INSERT statements. For example, when the database command includes a SQL INSERT statement, the database manager 46 performs a set of operations to insert data (e.g., a row into a table) specified by the SQL statement. Persons of the ordinary skill in the art will recognize that there may be numerous other SQL statements (e.g., CREATE, TRUNCATE, DROP, etc. to name a few) that a database command may include.

An example of a merge operation is discussed and shown at FIG. 4. In this example, a processing device such as the database manager 46 receives a request or command to merge data into a database. The command includes a merge statement, an example of which is shown below as follows:

MERGE INTO TEST.TARGET AS T
USING TEST.SOURCE AS S
ON T.C1=S.C1
WHEN MATCHED AND T.C2<10 THEN
UPDATE SET T.C3=S.C3||T.C3, T.C4=S.C4+5
WHEN MATCHED AND T.C2>15 THEN
DELETE
WHEN NOT MATCHED AND S.C2>0 THEN
INSERT VALUES(S.C1, S.C2, S.C3, S.C4)
ELSE IGNORE;

The MERGE statement directs the database manager to merge data from a source location (referred to as "SOURCE" or "S"), to a target location (referred to as "TARGET" or "T"). In this example, the source location is a source table and the target location is a target table in one or more data spaces. The tables each have a number n of columns "C", which are denoted as C.1 through C.n.

The MERGE clause specifies the table or view that is the target of the insert, update, or delete operations. The USING clause specifies the data source S being joined with the target (in this example, the source data is denoted as TEST.SOURCE). The ON clause specifies the join conditions that determine where the target and source match. The WHEN clauses (WHEN MATCHED, WHEN NOT MATCHED) specify the actions to take based on the results of the ON clause and any additional search criteria specified in the WHEN clauses.

The request includes an element of a search condition, referred to as a "predicate", which expresses or implies a comparison operation. In this example, the merge statement includes a join predicate expressed as "T.C1=S.C1". Predicates that specify only one table (e.g., "T.C2<10"), are referred to as local predicates.

The database command may also include statements describing how the source data is to be merged into the target. In one embodiment, these statements are referred to as UPDATE/DELETE/INSERT ("UDI") statements. An UPDATE statement is used to modify data values in a field (located at an intersection between a row and a column) based on corresponding data values in a source location. In the example shown in FIG. 3, the update statement is used to concatenate data values in a source table with data values in a corresponding target table. Thus, in the example of FIG. 3, data values in a row of the C3 column of the source table are concatenated with data values in a corresponding row of the target table if a condition is met, e.g., that the C2 data value in the target at that row is greater than 10.

A DELETE statement is used to delete values from the target table. In this example, when the C2 value of a matched row in the source table is greater than 15, the matched row in the target is deleted.

An INSERT statement is used to insert a row from the source table into a target table. In this example, if a row in the source table is not matched and a condition is met (in this example, the C2 value in the source at that row), then all or a selected subset of the source row is inserted into the target table.

In some instances, the target location is distributed among multiple pages, tables and/or table spaces. For example, the target location is distributed among one or more table spaces, and may also be distributed among one or more data tables and/or data pages. Each table space is represented in the table space map by a space map page, and each space map page specifies a number of data pages.

A processing device or system, such as the system 10, the processor 12 and/or the database manager 46, is configured to perform a merge operation that includes performing aspects of a merge in parallel based on characteristics of the target data. The processing device evaluates target data (e.g., target records and tables) among potentially multiple tables and table spaces to identify portions of the target data amenable to parallel operations, and performs aspects of a merge operation in parallel, by to different portions of the target data. In this manner, MERGE statement execution performance is enhanced by execution in parallelism.

Embodiments described herein provide substantial improvements to processing performance, particularly in performing merge operations. MERGE statements are widely used in database management, especially in maintenance work. However, a disadvantage of conventional merge processing is its inefficiency. Usually, the merge comes one by one, but for the insert with sub-select, even the result is a set as input for the insert. The database would typically get the result set and do the insert sequentially. Embodiments described herein address such deficiencies by providing the capability to evaluate target locations and perform merge operations in parallel, which greatly increases efficiency and speed of operations.

Figure 5:
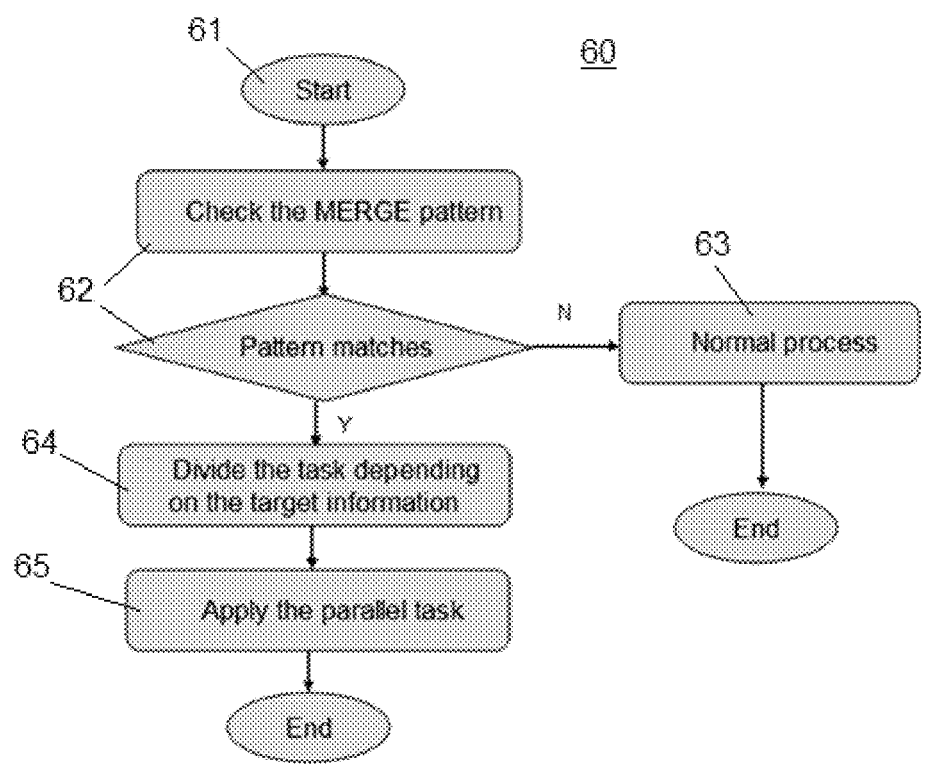
FIG. 5 is a flow diagram illustrating an embodiment of a method of performing a merge operation on a database, which includes evaluating target locations in the database to determine whether portions of the merge operation can be performed in parallel.

FIG. 5 illustrates aspects of an embodiment of a method 60 of performing a merge operation on a database or portion of a database. The merge operation, in one embodiment, includes insert, update, and/or delete operations on a target table or other portion of a database based on the results of a join with source data, e.g., a source table. For example, the merge operation is used to synchronize source table(s) and target table(s) by inserting, updating and/or deleting rows in a target table based on differences found in a source table.

The method 60 may be performed by any suitable processor or computer system capable of accessing memory blocks or other memory locations. Exemplary processors include one or more components of the computer system 10, the processor 12 and/or the database manager 48. In one embodiment, the method 60 includes the steps or stages represented by blocks 61-65 in the order described. However, in some embodiments, not all of the steps are performed and/or the steps are performed in a different order than that described.

At the first block 61, a processing device such as the processing unit 12 or the database manager 48 receives a query or database command that includes a merge request, e.g., in the form of a SQL MERGE statement. The MERGE statement specifies source data that is to be joined or merged to a number of target tables in one or more table spaces. An example of a MERGE statement follows:

SQL:
MERGE INTO TARGET T
USING SOURCE S
ON (S.C1=T.C1)
WHEN NOT MATCHED AND S.C1=18 THEN
   INSERT (C1, C2) VALUES (S.C1, S.C2)
WHEN MATCHED AND S.C2=T.C2+3 THEN
   UPDATE SET T.C1=T.C1+T.C2,
   T.C2=(SELECT A.C2+100
   FROM SOURCE AS A WHERE A.C1=5)
WHEN NOT MATCHED THEN
  SIGNAL SQLSTATE?70001'
  SET MESSAGE TEXT=? Cannot INSERT'
WHEN MATCHED AND S.C2=T.C2+2 THEN
  DELETE
ELSE IGNORE;

In one embodiment, the method inspects local predicates to apply parallel processing where applicable. In the above query, S.C1=18 is a local predicate for the source table. Also for the query above, the join predicate is S.C1=T.C1, and the T.C1 is the cluster index for target table T. It is noted that the above example is provided for illustrative purposes and is not intended to be limiting. The method may be applied to any suitable MERGE statement or other set of instructions, requests or commands.

The MERGE statement identifies source data or source records to be merged into one or more target tables, which may be a single table, tables within a single table space, or tables distributed among multiple table spaces. The source data, in one embodiment, includes one or more source tables, which may be remote tables accessed from a source location or a derived table that accesses remote source tables.

The processing device fetches source records as one or more source tables by applying local predicates from the MERGE statement. For example, the above MERGE statement specifies local predicates that identify a Target table T and columns T.C1 and T.C2 of the target table T. In one embodiment, fetching target records includes inspecting identifiers such as Record IDs (RIDs) that indicate the table and space map in which target records are located.

At the second block 62, the processing device checks the query (MERGE statement) to determine whether the target records can be divided for parallel execution of the MERGE statement. The processing device identifies a MERGE pattern, i.e., the distribution of target records according to table space, and determines whether the pattern qualifies for parallel processing.

In one embodiment, RIDs are used to calculate the space map page number which each record belongs to, sort these records according to RID to divide them into several subgroups according space map page scope.

Figure 6:
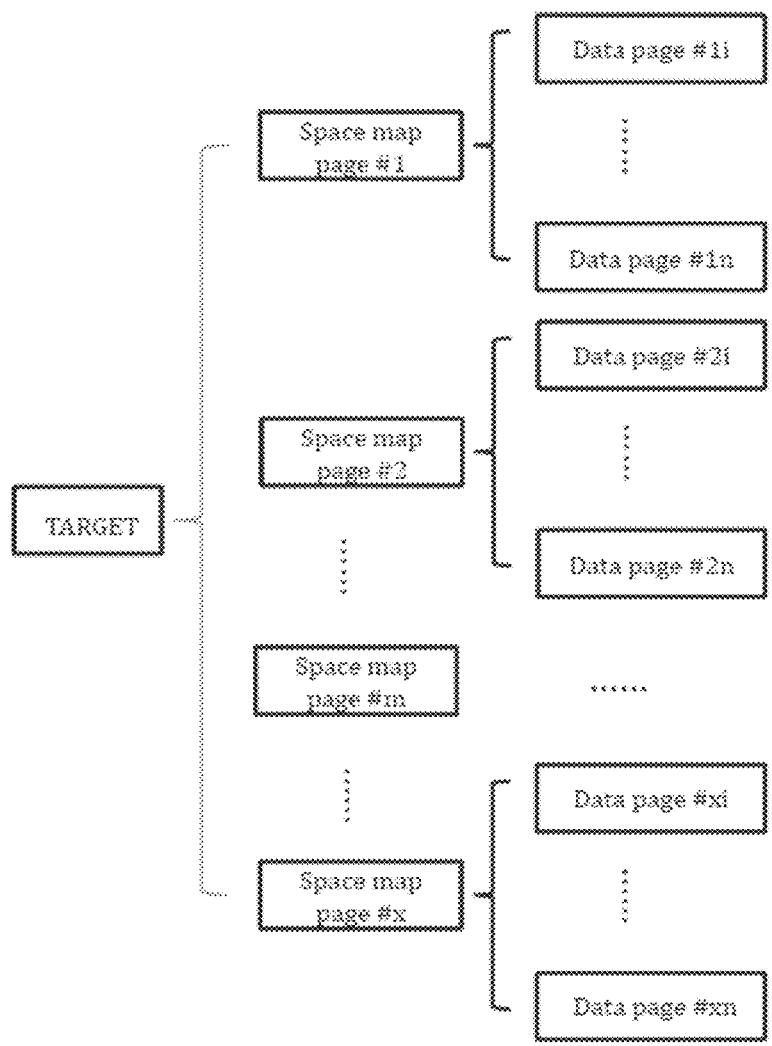
FIG. 6 depicts an example of target locations in a database as identified by a table space map.

For example, the target space may include a number of table spaces, each of which includes a number of data pages. FIG. 6 shows an example of target locations identified by a table space map. The target locations may be located within multiple table spaces, each of which include corresponding data pages located in each table space. The RID for each target record is inspected to determine where each target record is located. If the MERGE pattern includes target records in multiple table spaces or multiple portions of a table space, aspects of the merge operation applicable to different table spaces can be performed in parallel as described further below. As described herein "parallel" operations refer to operations that can be performed simultaneously or at least within the same time window.

At the third block 63, if the MERGE pattern does not qualify, parallel processing is not applied, and the merge operation is performed according to conventional methods.

Figure 7:
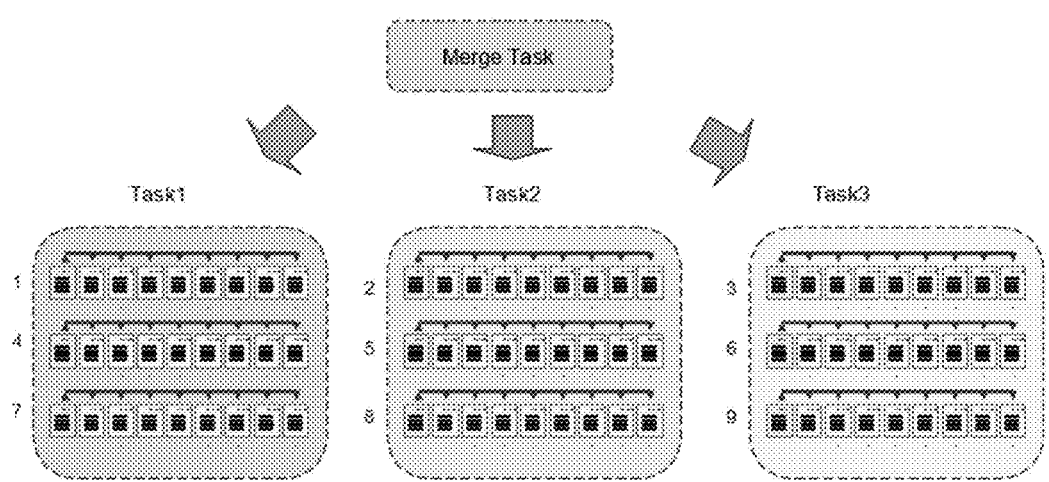
FIG. 7 illustrates division of a merge operation into multiple tasks that can be performed in parallel.

At the fourth block 64, if the MERGE pattern qualifies, the processing device divides the target records and their corresponding operations into multiple tasks that can be performed in parallel. For example, as shown in FIG. 7, a merge operation may be divided into a multiple tasks (or groups of tasks), shown here as Task1, Task2 and Task3, each of which show target records affected by the merge operation. The processing device divides the overall merge task according to statistics on the target table, including the RID of each target record. In one embodiment, a query optimizer would decide whether apply the parallel depending on the estimation cost and the statistics on the target table.

At the fifth block 65, if the MERGE pattern qualifies, the processing device applies the merge operation in parallel. For example, Task1, Task2 and Task3, each of which is associated with a different table space or portion of a table space, are performed simultaneously or at least within the same time window or time period.

Figure 8:
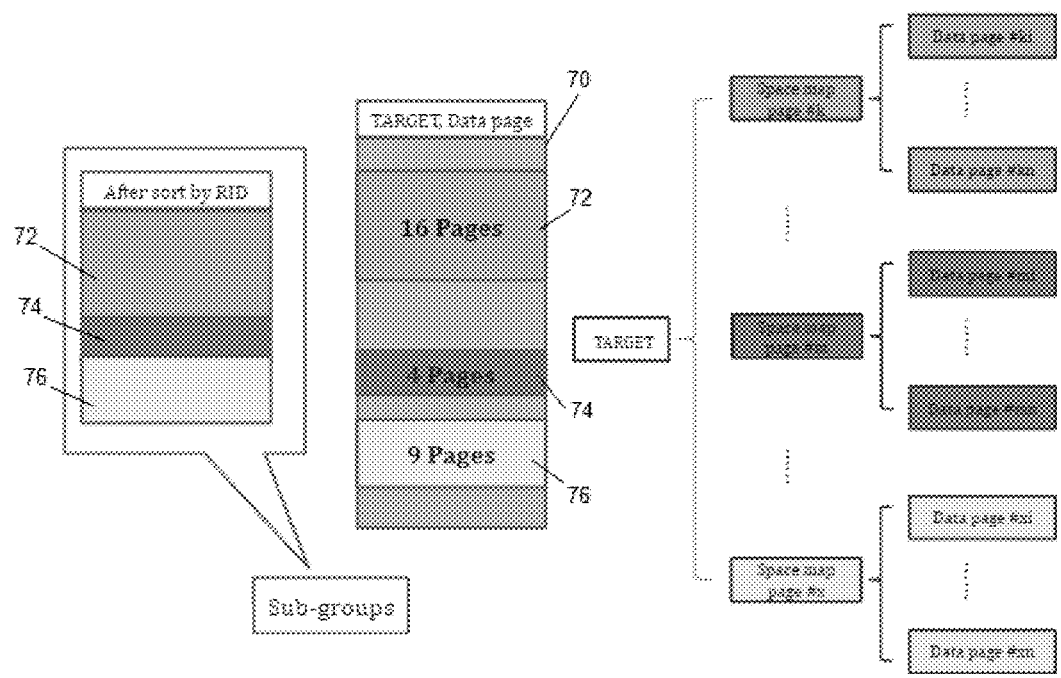
FIG. 8 depicts aspects of an embodiment of a method of performing a database merge operation, including dividing a target table into sub-groups according to table space location.

FIGS. 8-11 illustrate aspects of an embodiment of the method 60, which includes determining the character of a MERGE statement included in a database command or query, and depending on the results of such a determination, dividing a merge operation specified by the statement into multiple tasks and performing the tasks in parallel. An example of a command, provided for illustration purposes, is as follows:

MERGE INTO TEST.TARGET AS T
USING TEST.SOURCE AS S
ON T.C1=S.C1
AND T.C2 BETWEEN −20 and 100
AND S.C4<100
WHEN MATCHED AND T.C2<10 THEN
UPDATE SET T.C3=S.C3||'ABC',
T.C4=S.C4+5
WHEN MATCHED AND T.C2>15 THEN
DELETE
WHEN NOT MATCHED AND S.C2>0 THEN
INSERT VALUES(S.C1, S.C2, S.C3, S.C4)
ELSE IGNORE;

Referring to FIG. 8, a processing device receives the database command including a MERGE statement and applies local predicates to fetch target records. The RID for each target record is determined from a space map and used to sort the target records by table space. The database includes a partition that is divided into one or more table spaces, each of which includes a plurality of data pages. For example, table spaces are managed by a space map such as that shown in FIG. 8. The space map includes multiple space map pages, each of which manages 20 data pages.

Figure 9:
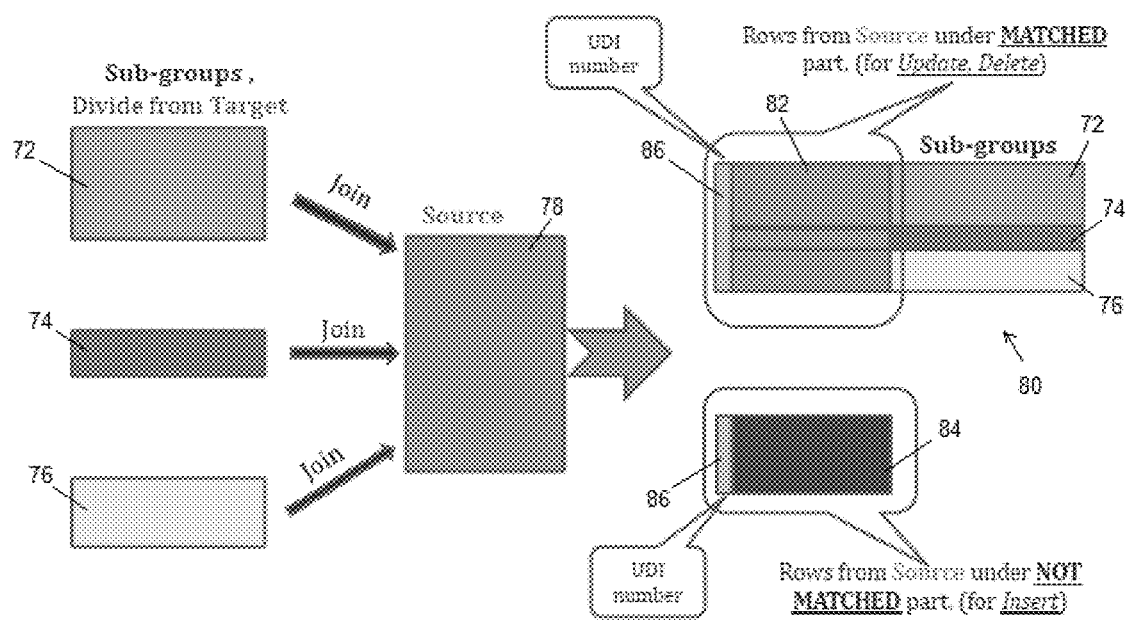
FIG. 9 depicts aspects of the method of FIG. 8, including joining the sub-groups and generating corresponding sub-inputs to table spaces in a database.

In the example of FIG. 8, the processing device inspects the RID of each target record, which are represented by a target table 70. The data page for each target record is identified and organized into target sub-groups based on space map page. In this example, target records associated with space map page #k are organized into a first target sub-group 72, target records associated with space map page #m are organized into a second target sub-group 74, and target records associated with space map #x are organized into a third target sub-group 76. This function may be performed according to the following statements:
SELECT . . . .
FROM TEST.TARGET
WHERE T.C2 BETWEEN −20 and 100
ORDER BY RID Each target sub-group is used to join with a source table in parallel in order to generate a plurality of sub-inputs. In one embodiment, each target sub-group is joined with a source table in parallel by applying the join predicate and local predicate of source records. For example, as shown in FIG. 9, the target sub-groups 72, 74 and 76 are joined to a source table 78
SELECT . . . .
FROM TEST.TARGET,
TEST.SOURCE
WHERE T.C1=S.C1
AND S.C4<100 where the join predicate is T.C1=S.C1, and the local predicate is S.C4<100.

The source table 78 represents source records to be merged with the target database partition. As a result of the joining, an input table 80 is generated that includes matched source rows 82 joined to corresponding target rows in each sub-group. A "matched source row" refers to a row or record in the source table that matches a row in the target table (a target record), i.e., has the same RID as the target table row. The matched source rows will be used to perform an update or delete operation on the corresponding target rows in the database.

Rows or records from the source table that were not matched ("unmatched rows") are shown in FIG. 9 as unmatched source rows 84. These unmatched source rows will be used to perform insert operations in the database.

Figure 10:
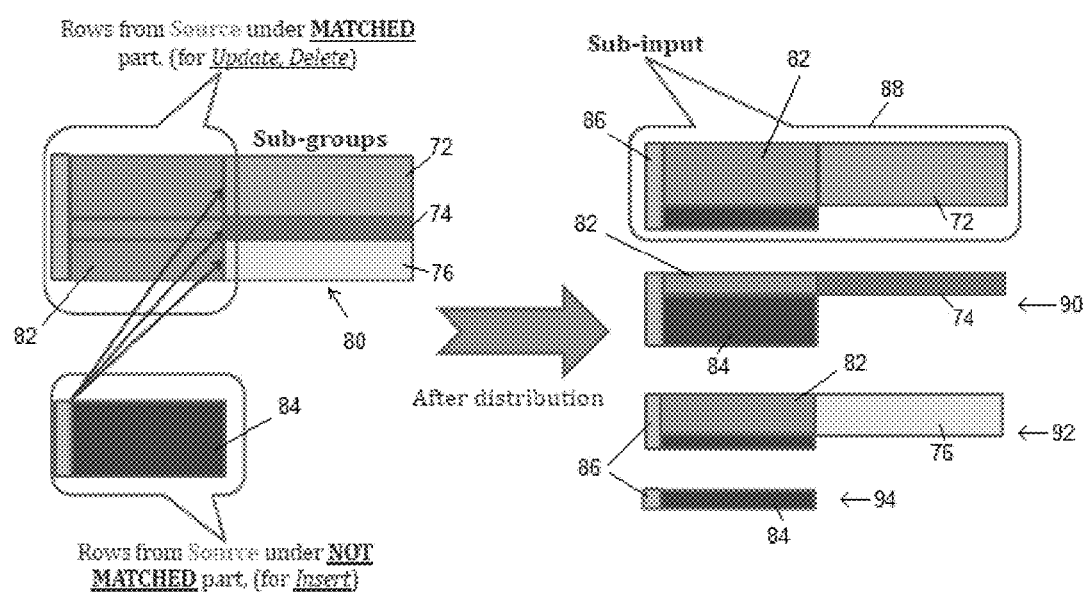
FIG. 10 depicts additional aspects of the method of FIG. 8 relating to generating sub-inputs to table spaces.

Referring to FIG. 10, the unmatched source rows are inserted into the input table 80 or otherwise distributed into sub-inputs. Each sub-input includes source records and target records associated with an individual table space and/or an individual table space map page. Each sub-input is used to perform an update, delete or insert operation. A UDI number 86 may be assigned to indicate the type of operation associated with each row or record.

Figure 11:
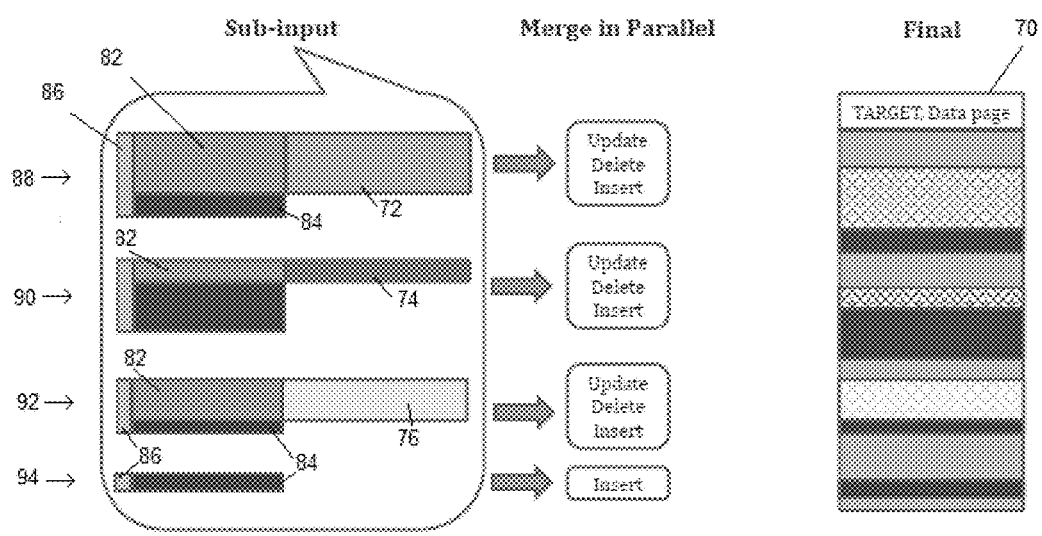
FIG. 11 depicts aspects of the method of FIG. 8, including performing a merge of each sub-input in parallel.

For example, the unmatched source rows are inserted into the input table, and the input table 80 is split into individual sub-inputs that will be applied to table spaces (or portions of table spaces) associated with a respective space map page. In the example of FIG. 10, unmatched records are distributed by, e.g., inserting with matched source records associated with the same space map page. The distribution results in sub-inputs 88, 90, 92 and 94. The sub-input 88 is applied to target records associated with space map page #k, the sub-input 90 is applied to target records associated with space map page #m, and the sub-input 92 is applied to target records associated with space map page #x. The sub-input 94 includes source records associated with a space map page that did not have matching target records As shown in FIG. 11, a merge operation is performed in parallel for each sub-input into the target locations specified by the respective table space map page. Data from a sub-input is used as the source data within the corresponding sub-group to perform an UPDATE/INSERT/DELETE operation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a structured query language (SQL) database command at a processing device, the processing device configured to manage a table space of a relational database, the database command including a merge statement configured to instruct the processing device to perform a merge operation;
identifying a group of target records from the database command, and associating each target record with one of a plurality of portions of the table space, wherein the merge statement includes one or more local predicates and wherein the group of target records are identified based on the one or more local predicates;
in response to determining that the group of target records is associated with more than one portion of the table space, sorting the target records into a plurality of sub-groups, each sub-group associated with a different portion of the table space, wherein each target record includes a record identifier (RID) that indicates a location within a data page associated with a space map page, and sorting the target records includes identifying matched target records having RIDs that indicate existing locations in the table space, wherein sorting the target records includes joining each sub-group into a source table used as an input to the merge operation, and dividing the source table into a plurality of sub-inputs, each sub-input including a respective sub-group, and identifying unmatched target records having RIDs that do not indicate an existing location;
generating a sub-task associated with each sub-group, the sub-task prescribing aspects of performing the merge operation on an associated portion of the table space using an associated sub-group respective sub-group; and
performing all of the sub-tasks in parallel.

2. The method of claim 1, wherein the processing device stores a table space map, the table space map representing the table space and describing logical to physical conversions of page locations in the table space, the table space map including a plurality of space map pages, each space map page representing one or more data pages in the table space.

3. The method of claim 2, wherein each portion of the table space corresponds to one of the plurality of space map pages, and each sub-group is associated with a different space map page.

4. The method of claim 1, wherein sorting the target records includes organizing each of the matched target records into one of the plurality of sub-groups, joining the sub-groups into a source table, and dividing the source table into sub-inputs, each sub-input associated with a respective space map page and including matched target records.

5. The method of claim 4, wherein sorting the target records includes distributing the unmatched target records into the sub-inputs based on the RID of each unmatched target record.

6. The method of claim 1, wherein the database includes a plurality of partitions, and the table space is defined by one of the partitions.

7. A system comprising:
a memory having computer readable instructions; and one or more processing devices for executing the computer readable instructions, the computer readable instructions comprising: receiving a structured query language (SQL) database command at a processing device, the processing device configured to manage a table space of a relational database, the database command including a merge statement configured to instruct the processing device to perform a merge operation;
identifying a group of target records from the database command, and associating each target record with one of a plurality of portions of the table space, wherein the merge statement includes one or more local predicates and wherein the group of target records are identified based on the one or more local predicates;
in response to determining that the group of target records is associated with more than one portion of the table space, sorting the target records into a plurality of sub-groups, each sub-group associated with a different portion of the table space, wherein each target record includes a record identifier (RID) that indicates a location within a data page associated with a space map page, and sorting the target records includes identifying matched target records having RIDs that indicate existing locations in the table space, wherein sorting the target records includes joining each sub-group into a source table used as an input to the merge operation, and dividing the source table into a plurality of sub-inputs, each sub-input including a respective sub-group, and identifying unmatched target records having RIDs that do not indicate an existing location;
generating a sub-task associated with each sub-group, the sub-task prescribing aspects of performing the merge operation on an associated portion of the table space using an associated sub-group respective sub-group; and
performing all of the sub-tasks on the memory space in parallel.

8. The system of claim 7, wherein the processing device stores a table space map, the table space map representing the table space and describing logical to physical conversions of page locations in the table space, the table space map including a plurality of space map pages, each space map page representing one or more data pages in the table space.

9. The system of claim 8, wherein each portion of the table space corresponds to one of the plurality of space map pages, and each sub-group is associated with a different space map page.

10. The system of claim 7, wherein sorting the target records includes organizing each of the matched target records into one of the plurality of sub-groups, joining the sub-groups into a source table, and dividing the source table into sub-inputs, each sub-input associated with a respective space map page and including matched target records.

11. The system of claim 10, wherein sorting the target records includes distributing the unmatched target records into the sub-inputs based on the RID of each unmatched target record.

12. A computer program product comprising a computer readable storage medium having program instructions embodied therewith, the program instructions executable by a processing device to cause the processing device to perform a method comprising:
  receiving a structured query language (SQL) database command at a processing device, the processing device configured to manage a table space of a relational database, the database command including a merge statement configured to instruct the processing device to perform a merge operation;
  identifying a group of target records from the database command, and associating each target record with one of a plurality of portions of the table space, wherein the merge statement includes one or more local predicates and wherein the group of target records are identified based on the one or more local predicates;
  in response to determining that the group of target records is associated with more than one portion of the table space, sorting the target records into a plurality of sub-groups, each sub-group associated with a different portion of the table space, wherein each target record includes a record identifier (RID) that indicates a location within a data page associated with a space map page, and sorting the target records includes identifying matched target records having RIDs that indicate existing locations in the table space, wherein sorting the target records includes joining each sub-group into a source table used as an input to the merge operation, and dividing the source table into a plurality of sub-inputs, each sub-input including a respective sub-group, and identifying unmatched target records having RIDs that do not indicate an existing location;
  generating a sub-task associated with each sub-group, the sub-task prescribing aspects of performing the merge operation on an associated portion of the table space using an associated sub-group respective sub-group; and performing all of the sub-tasks in parallel.

13. The computer program product of claim 12, wherein the processing device stores a table space map, the table space map representing the table space and describing logical to physical conversions of page locations in the table space, the table space map including a plurality of space map pages, each space map page representing one or more data pages in the table space.

14. The computer program product of claim 13, wherein each portion of the table space corresponds to one of the plurality of space map pages, and each sub-group is associated with a different space map page.

15. The computer program product of claim 12, wherein sorting the target records includes:
  organizing each of the matched target records into one of the plurality of sub-groups, joining the sub-groups into a source table, and dividing the source table into sub-inputs, each sub-input associated with a respective space map page and including matched target records; and
  distributing the unmatched target records into the sub-inputs based on the RID of each unmatched target record.

* * * * *